United States Patent Office 3,384,607
Patented May 21, 1968

3,384,607
VINYL CHLORIDE RESINS AND NITRILE RUBBERS PLASTICIZED WITH DIESTERAMIDES
Frank C. Magne, Robert R. Mod, and Evald L. Skau, New Orleans, La., assignors to the United States of America as represented by the Secretary of Agriculture
No Drawing. Original application Sept. 29, 1964, Ser. No. 400,278. Divided and this application Mar. 24, 1965, Ser. No. 459,490
20 Claims. (Cl. 260—30.4)

ABSTRACT OF THE DISCLOSURE

Plastic compositions are obtained in which vinyl chloride resins or nitrile rubbers are plasticized with diesteramides derived from diethanol amine. The acyl portion of the amide moiety can be derived from monoolefinic carboxylic acids or such acids which contain at least one epoxy group, or which contain an alkyl chain substituted with at least one epoxy group. The hydrocarbon moiety of the acids used to esterify the ethanol groups can comprise phenyl, cyclohexyl, or substituted phenyl. The N-bis(2-acetoxyethyl) amide of selectively hydrogenated cottonseed oil fatty acids and the N-bis(2-acetoxyethyl) amide of epoxidized cottonseed oil fatty acids are particularly suitable as softeners for nitrile rubber.

A non-exclusive, irrevocable, royalty-free license in the invention herein described, throughout the world for all purposes of the United States Government, with the power to grant sublicenses for such purposes, is hereby granted to the Government of the United States of America.

This application is a division of Ser. No. 400,278, filed Sept. 29, 1964, which was a continuation-in-part of Ser. No. 147,377, filed Oct. 24, 1961, now U.S. Patent No. 3,179,615.

This invention relates to a plastic composition, the plasticizer component of which is a novel class of amides. The amides which form the plasticizer component of the resinous composition which is subject of this invention have the ability to plasticize both the hydrophilic and hydrophobic type of resins and in addition are characterized by their ability to confer softening characteristics on nitrile rubbers.

It is known to prepare amides of the type represented by the formula

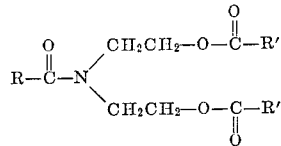

where R and R' are the same substituent alkyl group (particularly a saturated alkyl group with chain length of from 2 to 9 carbon atoms). These amides have recognized utility as plasticizers for vinyl-chloride-type resins, but it is well known that whenever the length of the carbon chain in the substituent alkyl groups exceeds 8 or 9 carbon atoms, i.e., when $R=R'=C_nH_{2n+1}$ and $n$ exceeds 9, compatibility with the vinyl-chloride-type resin is lost. It is known that compounds of the formula

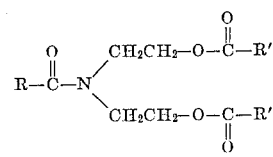

are incompatible if $R=R'=CH_3$; or if $R=R'=$ a long-chain mono-olefinic alkenyl group such as $C_{17}H_{33}$. We have found that compounds of this formula are also incompatible if $R'=CH_3$ and R is a long-chain saturated alkyl such as $C_{15}H_{31}$; or if $R'=CH_3$ and R is a long-chain polyolefinic alkenyl group such as $C_{17}H_{31}$.

We have made the surprising discovery, however, that compounds on this formula are compatible if $R'=CH_3$ and R is a long-chain, mono-olefinic alkenyl group; a long-chain, mono-olefinic alkenyl group containing in addition at least one epoxy group; or a long-chain alkyl group containing at least one epoxy group. As used herein the term "mono-olefinic alkenyl group" relates to long-chain groups containing from 11 to 21 carbon atoms and containing one double bond, such as $C_{17}H_{33}$ ($C_nH_{2n-1}$); the term "mono-olefinic alkenyl group containing at least one epoxy group" relates to long-chain groups containing from 11 to 21 carbon atoms, containing one double bond and, in addition, containing at least one epoxy group, such as $C_{17}H_{31}O$, $C_{17}H_{29}O_2$, etc.; the term "alkyl group containing at least one epoxy group" relates to long-chain groups of 11 to 21 carbon atoms containing no double bond but containing at least one epoxy group, such as $C_{17}H_{33}O$, $C_{17}H_{31}O_2$, etc. The term "epoxy group" as used herein is frequently referred to below as an "oxirane ring," the two being considered herein to be equivalent.

It is the object of this invention to supply amides of the type represented by the formula

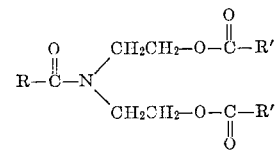

wherein R is a mono-olefinic alkenyl group, a mono-olefinic alkenyl containing at least one epoxy group, or an alkyl containing at least one epoxy group. R' may be methyl, phenyl, cyclohexyl, substituted phenyl such as —$C_6H_4COOR''$ or substituted cyclohexyl such as

—$C_6H_{10}COOR''$ where R'' represents a normal or branched chain saturated alkyl group of less than about nine carbon atoms.

It is also the object of this invention to supply amides or mixtures of amides represented by this formula consisting predominantly of diesteramides in which R represents an alkyl group (or alkyl groups) of chain length $C_{11}$ to $C_{21}$, these groups being monounsaturated containing at least one oxirane ring, or saturated alkyl groups containing at least one oxirane ring, and R' is a methyl, phenyl, cyclohexyl, or substituted phenyl such as

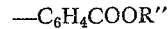

—$C_6H_4COOR''$ or substituted cyclohexyl such as —$C_6H_{10}COOR''$, where R'' represents a normal or branched chain saturated alkyl group of less than ten carbon atoms.

These diesteramides are efficient primary solvent-type plasticizers exhibiting good compatibility with, and imparting long-term thermal stability, low volatility, and brittle point to polymer and copolymer compositions of vinyl chloride. Those which contain one or more oxirane rings are effective stabilizers and impart a particularly high degree of thermal stability to the plasticized resin. Most important, when R' is a substituted phenyl, the diester amide shows exceptionally high resistance to soapy water extraction from the plasticized resin. The diesteramides are also, quite unexpectedly, efficient plasticizers for cellulose triacetate and in addition they possess utility as softeners for nitrile rubbers. The term "vinyl chloride resins" is used throughout this specification and the accompanying claims to refer to polymers and copolymers of monomers containing vinyl chloride in a predominant proportion in parts by weight. The terms such as "good compatibility," "compatible," and "compatible plasticizers" in reference to plasticizers for vinyl chloride resins are used throughout the specification to refer to plasticizers which show no signs of exudation or migration to the surface for at least 30 days when the plasticizer is present in the proportion of about 60 parts per 100 parts by weight of vinyl chloride resin.

The compatible diesteramides are primary plasticizers and act as compatibilizers for incompatible diesteramides. For example, the binary compositions where $$\underset{O}{\overset{R C-}{\|}}$$

is composed of 75% oleoyl—25% palmitoyl, or 85% epoxyoleoyl—15% palmitoyl and in which R′ is CH are compatible, as are all proportions of these two binary mixtures. Ternary compositions can tolerate even larger proportions of palmitoyl than would be expected; e.g., the 30% palmitoyl—35% epoxyoleoyl—35% oleoyl mixture is fully compatible. Thus, mixtures of long-chain fatty acids or esters can be used to prepare compatible diesteramides providing there is a predominance of mono-olefinic, epoxy-saturated, or epoxymono-olefinic, long-chain fatty acids individually or in combination in the mixture. The fatty acids obtained from cottonseed oil consist roughly of 27% of saturated (mostly palmitic) acid, 27% of monounsaturated (oleic) acid, and 46% of polyunsaturated (linoleic) acid. The diesteramides prepared from cottonseed oil acids are incompatible because of the large proportion of saturated and polyunsaturated acyl groups in the mixture. Compatible diesteramides can, however, be prepared from cottonseed oil acids which have been modified either by converting the polyunsaturated acyls in the mixture to monounsaturated acyls by selective hydrogenation, dimerization, halogenation, epoxidation, or by converting the polyunsaturated acyls alone or both the polyunsaturated and the monounsaturated acyls to saturated epoxyacyls. Similar adjustments in composition can be made in the fatty acid mixtures obtainable from other natural sources, such as vegetable or animal oils and fats, tall oil, and the like, to prepare compatible diesteramides. These adjustments of the degree of unsaturation may be performed on the original oils, on the acids, on the esters, or on the diesteramides prepared from them. In general it is usually preferred to perform the epoxidation at the diesteramide stage.

Not only are the particular amides and mixtures of amides herein described compatible vinyl-type resin plasticizers, but the instant invention is considerably broader in that it also contemplates the use of the compatible (compatible with respect to the particular resin involved) binary, ternary, or multiple-component mixtures of amides of saturated, monounsaturated, and polyunsaturated acids such as synthetic mixtures of fatty acids or mixtures of fatty acids which can be derived with or, in some instances, without hydrogenation or epoxidation, from such natural sources as menhaden oil, cottonseed oil, soybean oil, rapeseed oil, jojoba oil, parsley seed oil, *Limanthes douglasii* seed oil, palm oil, *Vernonia anthelmintica* seed oil, Cuphea seed oil, Crambe seed oil, castor oil, and the like, or from foots, tall-oil acids or rosin acids.

The amides which are the subject of this invention we shall refer to as diesteramides and they can be prepared as we shall show presently in a variety of ways. These diesteramides, which carry two substituent alkyl groups, e.g., two methyl groups and one substituent alkyl group of chain length exceeding 11 carbon atoms which substituent group may be monounsaturated and/or epoxidized are, as noted above, unexpectedly compatible with vinyl chloride type resins. When the long-chain alkyl substituent is monounsaturated, complete compatibility with vinyl type resins exists up through chain lengths of $C_{17}$. Additionally, if the long-chain alkyl substituent group is an epoxy-containing saturated or monounsaturated group, compatibility with vinyl chloride type resins extends through $C_{21}$ chain lengths.

The diesteramides which are the subject of this invention can be prepared by the following sequential reactions. First, an alkanolamine such as diethanolamine is reacted with the alkyl ester, e.g., the methyl ester, of a long-chain fatty acid. This initial reaction is an ester-exchange type of reaction and is carried out in the presence of an alkoxide catalyst; e.g., sodium methoxide. If the alkanolamine used is diethanolamine, an N-bis(2-hydroxyethyl) amide of a fatty acid is formed. The product of this first reaction is subsequently reacted with the acid anhydride or the acid chloride of an acid such as acetic, propionic, isobutyric, benzoic, or hexahydrobenzoic, or of the monoester of dibasic acids such as benzene dicarboxylic, cyclohexane dicarboxylic, and succinic, or the diester of the tribasic acids such as benzene tricarboxylic, or cyclohexane tricarboxylic. Acetic acid or benzoic acid, or the monoesters of benzene dicarboxylic and cyclohexane dicarboxylic acids are the preferred acids to esterify the two hydroxyl groups present. The diesteramides prepared by the aforementioned sequence of reactions, we shall refer to as "symmetrical" diesteramides prepared by the "directed" method.

Other dialkanolamines which may be used instead of diethanolamine are di-alkanolamines such as di-isopropanolamine (1,1′-imino-di-2-propanol), 3,3′-iminodipropanol, and the like.

It is possible, alternatively, to prepare diesteramides by reacting simultaneously all the components (the dialkanolamine and the two fatty acids of different chain lengths). The result of this alternative process wherein all of the reaction components are present at the same time in the reaction mixture produces what we shall refer to hereinafter as the "mixed" diesteramides produced by the "undirected" method. Since the reaction is a random one, the precise location of the various alkyl substituents is not known and cannot be predicted with certainty as it can with the directed reaction method. Mixed diesteramides could possibly contain all of the following diesteramides:

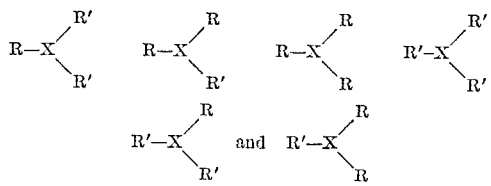

where X represents the moiety

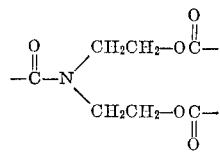

The following examples are set forth by way of illustration only and it will be understood that the invention is not to be construed as limited by the details therein.

Example 1.—N-bis(2-acetoxyethyl)oleamide

Two hundred and ninety-six grams (1 mole) of methyl oleate was slowly added to a vigorously stirred mixture of 105 grams (1 mole) of diethanolamine and 3.6 grams (0.15 mole) of metallic sodium dissolved in absolute methanol. The reaction was carried out with continued stirring at 65 to 75° C. and at 60 millimeters pressure. It is necessary to add the methyl oleate slowly so as to control frothing of the reaction mixture. The reaction was complete after all the methyl oleate had been added and the evolution of methanol had ceased. The product of this reaction was N-bis(2-hydroxyethyl)oleamide. To 124 grams (approximately 0.34 mole) of N-bis(2-hydroxyethyl)oleamide from the above reaction was slowly added with stirring 80 grams (0.78 mole) of acetic anhydride. The reaction temperature was maintained at 70 at 75° C. during and for an additional 30 minutes subsequent to the addition of the acetic anhydride. The reaction product was taken up in commercial hexane, washed free of acetic acid with water, and stripped of hexane. Analysis of the stripped product showed 3.09% nitrogen. The theoretical nitrogen content for N-bis(2-acetoxyethyl)oleamide is 3.09%. This material was tested as a plasticizer for vinyl chloride resin (see Sample No. 1A in Table I).

A separate fraction of the diesteramide prepared as above was distilled in a short-path still at 0.3 millimeter pressure and a small fraction boiling at 188° C. was rejected. The main distilaltion-cut, boiling at about 219° C. was tested as a plasticizer for vinyl chloride resin (see Sample No. 1B in Table I).

Example 2.—N-bis(2-benzoyloxyethyl)oleamide

To 35 grams (0.10 mole) of N-bis(2-hydroxyethyl) oleamide, prepared as shown in Example 1 and isolated from the reaction mixture by the addition of a slight excess of glycolic acid followed by extraction with hexane, washing and stripping, was added 30.8 grams (0.22 mole) of benzoyl chloride. The reaction was carried out in 35 grams of benzene. The temperature was raised slowly and maintained at 80° C. for two hours following which time 17.3 grams (0.22 mole) of pyridine was added. The temperature was then raised to 98° C., held for one hour, and the reaction mixture then allowed to cool. The reaction product was isolated from this mixture by washing with water, and with aqueous sodium carbonate, and finally stripped to remove the benzene. The product, N-bis(2-benzoyloxyethyl)oleamide, had a nitrogen content of 2.4% (theory 2.43). The product was tested as a vinyl chloride resin plasticizer (see Sample No. 2 in Table I).

Example 3.—N-bis(2-acetoxyethyl)linoleamide

This material was prepared by the method of Example 1, substituting methyl linoleate for the methyl oleate. The isolated product gave a nitrogen analysis of 2.87% (theory 3.10%). It was tested as a vinyl chloride resin plasticizer (see Sample No. 3 in Table I).

When N-bis(2-hydroxyethyl)lineolamide is prepared by the procedure of Example 1 by substituting methyl lineoleate for methyl oleate and further reacted with benzoyl chloride by the procedure of Example 2, the resulting product is N-bis(2-benzoyloxyethyl)lineolamide. This product is then epoxidized to monounsaturation by the procedure of Example 6 resulting in N-bis(2-benzoyloxyethyl)epoxyoleamide which is compatible.

Generally similar results are obtained when the products resulting when the benzoyl chloride is replaced with hexahydrobenzoyl chloride, ortho-carbobutoxyhexahydrobenzoyl chloride, or with ortho-carbobutoxybenzoyl chloride. The resulting epoxidized products are N-bis(2-hexahydrobenzoyloxyethyl)epoxyoleamide,
N-bis[2-(ortho-carbobutoxyhexahydrobenzoyloxy)
  ethyl]epoxyoleamide,
and N-bis[2-(ortho-carbobutoxybenzoyloxy)ethyl]
  epoxyoleamide, respectively.

Example 4.—N-bis(2-acetoxyethyl)amide of cottonseed oil fatty acids

This material was prepared by the method of Example 1, using the methyl esters of cottonseed oil fatty acids instead of methyl oleate. (The methyl esters were derived from cottonseed oil fatty acids having on iodine value (I.V.) of 113 and a neutralization equivalent of 273.) This product gave a nitrogen analysis of 3.10% (theory 3.15%). It was tested as a plasticizer for vinyl chloride resin (see Sample No. 4 in Table I).

Example 5.—N-bis(2-acetoxyethyl)amide of selectively hydrogenated cottonseed oil fatty acids This material was prepared by the method of Example 1 using the methyl esters of selectively hydrogenated cottonseed oil fatty acids instead of methyl oleate. (The selectively hydrogenated cottonseed oil fatty acids had an I.V. of 73.2, a thiocyanogen value of 68.0, and a neutralization equivalent of 274.) The product had an I.V. of 44.9 and gave a nitrogen analysis of 3.05% (theory 3.14%). It was tested as a vinyl chloride resin plasticizer (see Sample No. 5 in Table I).

The product, N-bis(2-acetoxyethyl)amide of the hydrogenated cottonseed acids, was tested as a plasticizer for cellulose triacetate (41% acetyl). This composition, cast as a film from a mixture of 30 parts of diesteramide and 100 parts of cellulose triacetate in acetone solvent, was flexible, clear, nongreasy, and withstood repeated flexing along a sharp crease without cracking. This is a compatible composition.

Example 6.—N-bis(2-acetoxyethyl)epoxyoleamide 0.077 mole of the product from Example 3 was dissolved in 50 grams of chloroform and added slowly to 192 grams of a chloroform solution of perbenzoic acid, containing 11.7 grams (0.085 mole) of perbenzoic acid, while maintaining a temperature of 0 to 5° C. The reaction mixture was allowed to stand at 0° C. for 24 hours. The N-bis(2-acetoxyethyl)epoxyoleamide was extracted with a volume of diethyl ether equal to two times that of the reaction mixture. The extract was washed free of any benzoic acid, and the ether stripped off. The product had a nitrogen content of 2.73% (theory 2.99%) and an oxirane-oxygen content of 3.74% (theory 3.42%). It was tested as a plasticizer for vinyl chloride resin (see Sample No. 6 in Table I).

Example 7.—N-bis(2-acetoxyethyl)amide of partially epoxidized cottonseed oil fatty acids The product of Example 4 was partially epoxidized with perbenzoic acid by the process described in Example 6. In this instance the ratio of perbenzoic acid to amide was 0.056 to 0.077 mole. The oxirane-oxygen content of the product was 2.35%. The product was tested as a plasticizer for vinyl chloride resin (see Sample No. 7 in Table I).

Example 8.—N-bis(2-acetoxyethyl)amide of completely epoxidized rapeseed fatty acids The N-bis(2-acetoxyethyl)amide of rapeseed acids was prepared by the method of Example 1 except that the methyl esters of rapeseed fatty acids were used in place of methyl oleate. This product had an I.V. of 73.8 and a nitrogen content of 2.69% (theory 2.94%). It was evaluated as a vinyl chloride resin plasticizer and found to be incompatible. It was epoxidized by the procedure of Example 7 to an oxirane content of 3.93% using 1.3 moles of perbenzoic acid per mole of amide. The epoxidized product was tested as a vinyl chloride resin plasticizer (see Sample No. 8 in Table I).

Example 9.—Mixed diesteramides (undirected process) of selectively hydrogenated cottonseed oil acids and acetic acid 0.20 mole of diethanolamine, 0.40 mole of glacial acetic acid, 0.205 mole of the selectively hydrogenated cottonseed acids described in Example 5, and 25 ml. of benzene were refluxed in an oil bath at a temperature of 200° C. until there was no further evolution of water. (This was ascertained by observing the water collected in the Dean-Stark trap.) the reaction product was cooled, dissolved in commercial hexane, washed to remove diethanolamine or acetic acid, dried, percolated through a column of activated alumina, and the hexane stripped off. This product gave a nitrogen analysis of 3.09% (theory 3.14%). It was tested as a vinyl chloride resin plasticizer (see Sample No. 9 in Table I).

Example 10.—Mixed diesteramides of oleic and acetic acids

The same procedure and the same molar proportions of reactants were used as in Example 9, except that oleic acid was used instead of the hydrogenated cottonseed acids. This product gave a nitrogen analysis of 2.71% (theory 3.09%). It was tested as a vinyl chloride resin plasticizer (see Sample No. 10 in Table I).

Example 11.—Mixed diesteramides of epoxidized cottonseed oil acids and acetic acid The same procedure and the same molar proportions of reactants were used as in Example 9 except that the cottonseed oil fatty acids described in Example 4 were used instead of the hydrogenated cottonseed oil fatty acids. This product gave a nitrogen analysis of 2.73% (theory 3.14%). It was partially epoxidized using the same process and molar proportions of amide and perbenzoic acid as shown in Example 7. The end product had an oxirane-oxygen content of 1.58%. It was tested as a vinyl chloride resin plasticizer (see Sample No. 11 in Table I).

Example 12.—N-bis[2-(ortho-carbobutoxybenzoyloxy)ethyl]oleamide

Ortho-carbobutoxybenzoic acid is prepared by the procedure of Levene et al., J. Biol. Chem. 75, 587–605 (1927), and converted to ortho-carbobutoxybenzoyl chloride with thionyl chloride. To a well-stirred mixture of 13 g. (0.035 mole) of N-bis(2-hydroxyethyl)oleamide, 7 g. (0.09 mole) of pyridine, and 200 ml. of benzene, are added dropwise 18 g. (0.075 mole) of the freshly prepared o-carbobutoxybenzoyl chloride. Stirring is continued for 30 min. beyond the last addition of acid chloride. The pyridine hydrochloride is then filtered off and the filtrate washed with water, 5% sodium bicarbonate, and water. The dry solution is then percolated through activated $Al_2O_3$ to remove residual acidity and the amide recovered by stripping off the solvent. The product, N-bis[2-(ortho-carbobutoxybenzoyloxy)ethyl]oleamide, has a nitrogen content of 1.82% (theory 1.80%). Plasticizer tests on vinyl chloride resins are shown as Sample 12, Table I.

The plasticized vinyl chloride resin was submitted to the soapy-water extractability test according to ASTM test D1239–55 and showed a loss of 0.83% compared with a loss of 1.00% for the control, di-2-ethylhexylphthalate (DOP).

When the o-carbobutoxybenzoyl chloride is replaced by hexahydrobenzoyl chloride in the above synthesis, N-bis (2-hexahydrobenzoyloxyethyl)oleamide is produced. When the o-carbobutoxybenzoyl chloride is replaced by o-carbobutoxyhexahydrobenzoyl chloride in the above synthesis, N-bis[2-(ortho-carbobutoxyhexahydrobenzoyloxy)ethyl]oleamide is produced. When the o-carbobutoxybenzoyl chloride is replaced by ortho- carbo-2-ethylhexyloxy hexahydrobenzoyl chloride the product is N-bis[2-(ortho-[carbo - 2 - ethylhexyloxy]hexahydrobenzoyloxy) ethyl]oleamide. When the o-carbobutoxybenzoyl chloride is replaced by orthocarbomethoxyhexahydrobenzoyl chloride in the above synthesis, N-bis[2-(ortho-carbomethoxyhexahydrobenzoyloxy)ethyl]oleamide is produced. When incorporated in vinyl chloride resins, these oleamides are satisfactory plasticizers.

Example 13.—N-bis[2-(ortho-[carbo-2-ethylhexyloxy]benzoloxy)-ethyl]oleamide

Ortho-(carbo-2-ethylhexyloxy)benzoic acid is prepared by the method of Levene et al., J. Biol. Chem., 75, 587–605 (1927), and converted to ortho-(carbo-2-ethylhexyloxy)-benzoyl chloride with thionyl chloride. N-bis(2-hydroxyethyl)oleamide was reacted with ortho-(carbo-2-ethylhexyloxy)benzoyl chloride by the procedure described in Example 12. The product, N-bis[2 - ortho-[carbo-2-ethylhexyloxy]benzoyloxy)ethyl]oleamide has a nitrogen content of 1.47% (theory 1.50%). It was tested as a plasticizer for vinyl chloride resin (see Sample 13 in Table I).

Example 14.—N-bis[2-(p-carbomethoxybenzoyloxy)ethyl]oleamide p-Carbomethoxybenzoic acid was prepared as described by Williams et al., J. Org. Chem. 25, 812–820 (1960), with the following modifications to eliminate dimethylterephthalate and terephthalic acid contaminants. The wet reaction mixture was suspended in a large volume of water, the half esters and acid converted to sodium salts by the addition of an excess of sodium carbonate, and the dimethylterephthalate removed by extraction with diethyl ether. The aqueous solution was then acidified and the half ester and terephthalic acid recoverd by filtration and dried. This mixture had a neutralization equivalent of 157.5. The half ester was extracted from the mixture by prolonged Soxhlet extraction with benzene. This product, p-carbomethoxy-benzoic acid (neutralization equivalent 178.8, theory 180.1), was converted to the acid chloride as reported by Williams. The acid chloride, M.P. 54–55 C., was reacted with N-bis (2 - hydroxyethyl)oleamide following the procedure described in Example 12 except that the acid chloride was added to the N-bis(2-hydroxyethyl) oleamide. The product N-bis[2 - (p-carbomethoxybenzoyloxy)ethyl]oleamide had a nitrogen content of 2.15% (theory 2.02%). It was tested as a plasticizer for vinyl chloride resin (see Sample 14 in Table I). It did not pass the 30-day compatibility test and therefore it must be used at lower proportions relative to the polyvinyl chloride resin and it can also be used as a secondary plasticizer.

Example 15.—N-bis(2-acetoxyethyl)epoxystearamide

This material is prepared by epoxidizing N-bis(2-acetoxyethyl)oleamide with peracetic acid. The product, N-bis(2 - acetoxyethyl)epoxystearamide has an oxirane oxygen content of 2.96% (theory 3.41%). It was tested as a plasticizer for vinyl chloride resin (see Sample 15 in Table I).

When the N-bis(2 - acetoxyethyl)oleamide is replaced by N-bis(2 - benzoyloxyethyl)oleamide, N-bis(2-benzoyloxyethyl)-epoxystearamide is produced. When N-bis (2-hexahydrobenzoyloxyethyl)oleamide is used, the product N-bis ( 2 - hexahydrobenzoyloxyethyl)epoxystearamide results. The use of N-bis[2-(o-carbobutoxybenzoyloxy)-ethyl]oleamide in the above process produces N-bis[2-(o-carbobutoxybenzoyloxy)ethyl]epoxystearamide. Epoxidation of N-bis[2 - (ortho-[carbo - 2 - ethylhexyloxy]-benzoyloxy)ethyl]oleamide gives N-bis[2 - (ortho-[carbo-2-ethylhexyloxy]benzoyloxy)ethyl]epoxystearamide.

When the oleamides of Example 15 are replaced by the corresponding linoleamide derivatives, the corresponding diepoxystearamide derivatives are obtained.

When used as plasticizers in polyvinyl chloride resins, these epoxystearamide and diepoxystearamide derivatives are compatible, and are also efficient stabilizers.

Example 16.—N-bis(2-acetoxyethyl)diepoxystearamide

This material is prepared by epoxidizing N-bis (2-acetoxyethyl)linoleamide with paracetic acid. The product, N-bis(2 - acetoxyethyl)dipoxystearamide has an oxirane content of 5.38% (theory 6.57%). It was tested as a plasticizer for vinyl chloride resin (see Sample 16 in Table I).

The various diesteramides were tested as plasticizers for vinyl chloride-vinyl acetate (95:5) copolymer resin (Vinylite VYDR) in the following formulation:

| | Percent |
|---|---|
| Vinyl chloride resin | 63.5 |
| Diesteramide | 35.0 |
| Stearic acid | 0.5 |
| Basic lead carbonate | 1.0 |

This formulation for each diesteramide sample was milled, molded, and tested. The results are shown in Table I, Examples 1 through 11. In all examples the sample was rated incompatible if the molded stock showed any evidence of exudation or migration to the surface during a shelf storage of 30 days.

The following formulation was used to test the diesteramides as softeners for nitrile rubber (Hycar 1042—33% acrylonitrile):

|  | Parts |
|---|---|
| Nitrile rubber | 100.0 |
| SRF black | 60.0 |
| Zinc oxide | 5.0 |
| Stearic acid | 1.5 |
| Sulfur | 1.5 |
| Benzothiazyldisulfide | 1.5 |
| Softener | 20.0 |

These compositions were cured for 30 minutes at 310° F. The N-bis(2-acetoxyethyl) amides of the hydrogenated and partially epoxidized cottenseed oil acids (prepared in Examples 5 and 7, respectively) were found to be acceptable compatible softeners for nitrile rubber, showing no signs of spewing in 30 days. The test results for these compositions are shown as Samples 5 and 7, respectively, in Table II.

TABLE I

| Sample No. | Tensile strength, p.s.i. | 100% Modulus, p.s.i. | Elongation percent | Brittle point ° C. | Volatility loss, percent | Compatibility a |
|---|---|---|---|---|---|---|
| 1A | 2,810 | 1,620 | 310 | −44 | 0.60 | C |
| 1B | 3,090 | 1,670 | 320 | −43 | | C |
| 2 | 3,700 | 2,500 | 270 | −17 | | C |
| 3 | | | | | | I |
| 4 | | | | | | I |
| 5 | 3,060 | 1,650 | 370 | −36 | 0.82 | C |
| 6 | 3,280 | 1,450 | 370 | −20 | 0.33 | C |
| 7 | 2,910 | 1,620 | 290 | −28 | 0.25 | C |
| 8 | 3,390 | 1,970 | 290 | −25 | | C |
| 9 | 2,510 | 1,810 | 250 | −20 | 0.86 | C |
| 10 | 2,740 | 1,750 | 290 | −50 | 0.37 | C |
| 11 | 3,070 | 1,630 | 390 | −30 | 1.4 | C |
| 12 | 3,630 | 2,670 | 310 | −1 | 0.85 | C |
| 13 | 3,490 | 2,730 | 310 | −11 | 0.54 | C |
| 14 | 3,720 | 3,320 | 220 | +11 | 1.12 | I |
| 15 | 3,150 | 1,350 | 370 | −17 | 0.40 | C |
| 16 | 3,320 | 1,480 | 330 | −9 | 0.40 | C | a C=compatible; I=incompatible.

TABLE II

| Sample No. | Tensile Strength | | Elongation | | 300% Modulus | | Shore A Hardness, 10 sec. | Weight loss, percent | Brittle point, ° C. | Volume change, percent |
|---|---|---|---|---|---|---|---|---|---|---|
| | Unaged, p.s.i. | Aged, p.s.i. | Unaged, percent | Aged, percent | Unaged, p.s.i. | Aged, p.s.i. | | | | |
| 5 | 2,110 | 2,030 | 710 | 440 | 690 | 1,290 | 57 | 1.98 | −44 | 27.5 |
| 7 | 2,140 | 2,200 | 800 | 540 | 550 | 1,220 | 56 | 0.85 | −40 | 30.1 |

We claim:

1. A vinyl chloride resin composition, plasticized with a compound represented by the formula

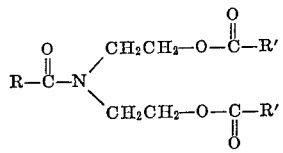

where R is at least one of the group mono-olefinic alkenyl, mono-olefinic alkenyl containing at least one oxirane ring, and an alkyl containing at least one oxirane ring, said group containing not less than 11 and not more than 21 carbon atoms and R' is selected from the group phenyl, cyclohexyl, substituted phenyl having the formula

—C$_6$H$_4$COOR'' and substituted cyclohexyl having the formula

—C$_6$H$_{10}$COOR'' where R'' represents a normal or branched chain saturated alkyl group of less than nine carbon atoms.

2. A vinyl chloride resin composition, plasticized with a compound represented by the formula of claim 1 wherein R is a mono-olefinic alkylene group.

3. The vinyl chloride resin composition of claim 2 wherein the plasticizer is N-bis(2-benozyloxyethyl)oleamide.

4. The vinyl chloride resin composition of claim 2 wherein the plasticizer is N - bis[2-(ortho-carbobutoxybenzoyloxy)ethyl]oleamide.

5. The vinyl chloride resin composition of claim 2 wherein the plasticizer is N-bis[2-(ortho-[carbo-2-ethylhexyloxy]benzoyloxy)ethyl]oleamide.

6. The vinyl chloride resin composition of claim 2 wherein the plasticizer is N - bis[2-(para-carbomethoxybenzoyloxy)ethyl]oleamide.

7. The vinyl chloride resin composition of claim 2 wherein the plasticizer is N - bis(2 - hexahydrobenzoyloxyethyl)oleamide.

8. The vinyl chloride resin composition of claim 2 wherein the plasticizer is N-bis[2 - (ortho - carbobutoxyhexahydrobenzoyloxy)ethyl]oleamide.

9. The vinyl chloride resin composition of claim 2 wherein the plasticizer is N - bis[2 - (ortho-carbomethoxyhexahydrobenzoyloxy)ethyl]oleamide.

10. A vinyl chloride resin composition, plasticized with a compound represented by the formula of claim 1 wherein R is a mono-olefinic alkenyl group containing at least one oxirane ring.

11. The vinyl chloride resin composition of claim 10 wherein the plasticizer is N - bis(2 - benzoyloxyethyl)-epoxyoleamide.

12. The vinyl chloride resin composition of claim 10 wherein the plasticizer is N - bis(2 - hexahydrobenzoyloxyethyl)epoxyoleamide.

13. The vinyl chloride resin composition of claim 10 wherein the plasticizer is N - bis[2-(ortho-carbobutoxyhexahydrobenzoyloxy)ethyl]epoxyoleamide.

14. The vinyl chloride resin composition of claim 10 wherein the plasticizer is N - bis[2-(ortho-carbobutoxybenzoyloxy)ethyl]epoxyoleamide.

15. A vinyl chloride resin composition, plasticized with a compound represented by the formula

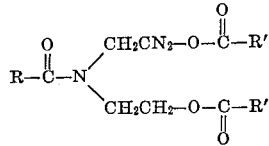

where R is an alkyl group containing at least one oxirane ring, said group containing not less than 11 and not more than 21 carbon atoms and R' is selected from the group consisting of phenyl, cyclohexyl, substituted phenyl having the formula —C$_6$H$_4$COOR'' and substituted cyclohexyl having the formula —C$_6$H$_{10}$COOR'' where R'' represents a normal or branched chain saturated alkyl group of less than nine carbon atoms.

16. The vinyl chloride resin composition of claim 15 wherein the plasticizer is N - bis(2 - benzoyloxyethyl)-epoxystearamide.

17. The vinyl resin chloride composition of claim 15 wherein the plasticizer is N-bis(2-hexahydrobenzoyloxyethyl)epoxystearamide.

18. The vinyl chloride resin composition of claim 15 wherein the plasticizer is N - bis[2-(ortho-carbobutoxybenzoyloxy)ethyl]epoxystearamide.

19. The vinyl chloride resin composition of claim 15 wherein the plasticizer is N-bis[2-(ortho-[carbo-2-ethylhexyloxy]benzoyloxy)ethyl]epoxystearamide.

20. A nitrile rubber and softener composition containing about 20 parts by weight of softener per 100 parts by weight of a 33% acrylonitrile rubber said softener being selected from the group consisting of the N-bis(2-acetoxyethyl) amide of cottonseed oil fatty acids selectively hydrogenated to convert polyunsaturated acyls to monounsaturated acyls and the N-bis(2-acetoxyethyl) amide of cottonseed oil fatty acids epoxidized to an oxirane-oxygen content of about 2.35%.

No references cited.

ALLAN LIEBERMAN, *Primary Examiner.*